(12) United States Patent
Sukegawa (10) Patent No.: US 11,831,512 B2
(45) Date of Patent: Nov. 28, 2023

(54) SETTING SYSTEM WITH TRAFFIC CONTROL RULE AND TRAFFIC CONTROL SYSTEM

(71) Applicant: NEC Corporation, Tokyo (JP)

(72) Inventor: Masahiro Sukegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/640,027

(22) PCT Filed: Aug. 13, 2020

(86) PCT No.: PCT/JP2020/030796
§ 371 (c)(1),
(2) Date: Mar. 3, 2022

(87) PCT Pub. No.: WO2021/044825
PCT Pub. Date: Mar. 11, 2021

(65) Prior Publication Data
US 2022/0321419 A1 Oct. 6, 2022

(30) Foreign Application Priority Data
Sep. 4, 2019 (JP) .................. 2019-161224

(51) Int. Cl.
*G06F 15/173* (2006.01)
*H04L 41/0896* (2022.01)
*H04L 41/0894* (2022.01)

(52) U.S. Cl.
CPC ...... *H04L 41/0896* (2013.01); *H04L 41/0894* (2022.05)

(58) Field of Classification Search
CPC ................. H04L 41/0894; H04L 41/0896
(Continued)

(56) References Cited

U.S. PATENT DOCUMENTS 9,979,835 B1\* 5/2018 Jiang .................. H04M 15/885
2010/0074108 A1\* 3/2010 Olakangil ............ H04L 45/586
370/230

(Continued)

FOREIGN PATENT DOCUMENTS

JP 2001-237831 A 8/2001
JP 2007-156681 A 6/2007
(Continued)

OTHER PUBLICATIONS

"Traffic Management Solution," NEC Corporation, [retrieved on Aug. 19, 2019] on the Internet (https://jpn.nec.com/nsp/tms/index.html), 3 pages.
(Continued)

*Primary Examiner* — Hee Soo Kim
(74) *Attorney, Agent, or Firm* — Sughrue Mion, PLLC (57) ABSTRACT

To enable to set a traffic control rule for each wholesale business according to the wishes of a manager or the like, a setting system for setting control definition information, which is information acquired by combining a control rule defining the control of core network traffic with the internet protocol address of the communication terminal being the transmission destination of the traffic to which the control rule is applied, includes a switching setting information storage which stores the internet protocol address of the communication terminal assigned to the wholesale business, and switching setting information, which is information expressing the timing at which the application of each of the control definition information to the control switches, and includes a setting unit for setting the control definition information based on the switching setting information, wherein the switching setting information is stored in the switching setting information storage via an input operation.

10 Claims, 9 Drawing Sheets

(58) Field of Classification Search
USPC .......................................................... 709/223
See application file for complete search history.

(56) References Cited

U.S. PATENT DOCUMENTS

| | | | |
|---|---|---|---|
| 2013/0281075 A1* | 10/2013 | Kim .................... | H04L 41/0893 |
| | | | 455/418 |
| 2013/0318345 A1 | 11/2013 | Hengeveld | |
| 2017/0019424 A1 | 1/2017 | Rodrigues De Moura Leitao et al. | |
| 2017/0078886 A1* | 3/2017 | Raleigh ............... | H04W 12/086 |

FOREIGN PATENT DOCUMENTS

| | | |
|---|---|---|
| JP | 2009-260986 A | 11/2009 |
| JP | 2009-272693 A | 11/2009 |
| JP | 2015-041810 A | 3/2015 |
| JP | 2017-022788 A | 1/2017 |
| JP | 2018-201233 A | 12/2018 |
| WO | 2019/026837 A1 | 2/2019 |

OTHER PUBLICATIONS

International Search Report for PCT/JP2020/030796 dated Oct. 27, 2020 (PCT/ISA/210).
Written Opinion for PCT/JP2020/030796 dated Oct. 27, 2020 (PCT/ISA/237).
Japanese Office Communication for JP Application No. 2022-161000 dated Sep. 12, 2023 with English Translation.

* cited by examiner

SETTING SYSTEM WITH TRAFFIC CONTROL RULE AND TRAFFIC CONTROL SYSTEM

CROSS REFERENCE TO RELATED APPLICATIONS

This application is a National Stage of International Application No. PCT/JP2020/030796 filed Aug. 13, 2020, claiming priority based on Japanese Patent Application No. 2019-161224 filed Sep. 4, 2019, the disclosure of which is incorporated herein in its entirety by reference.

TECHNICAL FIELD

The present invention relates to a system that sets control information.

BACKGROUND ART

It has been a major issue for telecommunications carriers to develop an infrastructure that can address an increase in data communication with limited investment and improve user satisfaction. One system that solves such an issue is a Traffic Management Solution (TMS) system of NEC Corporation (refer to NPL 1).

Figure 1:
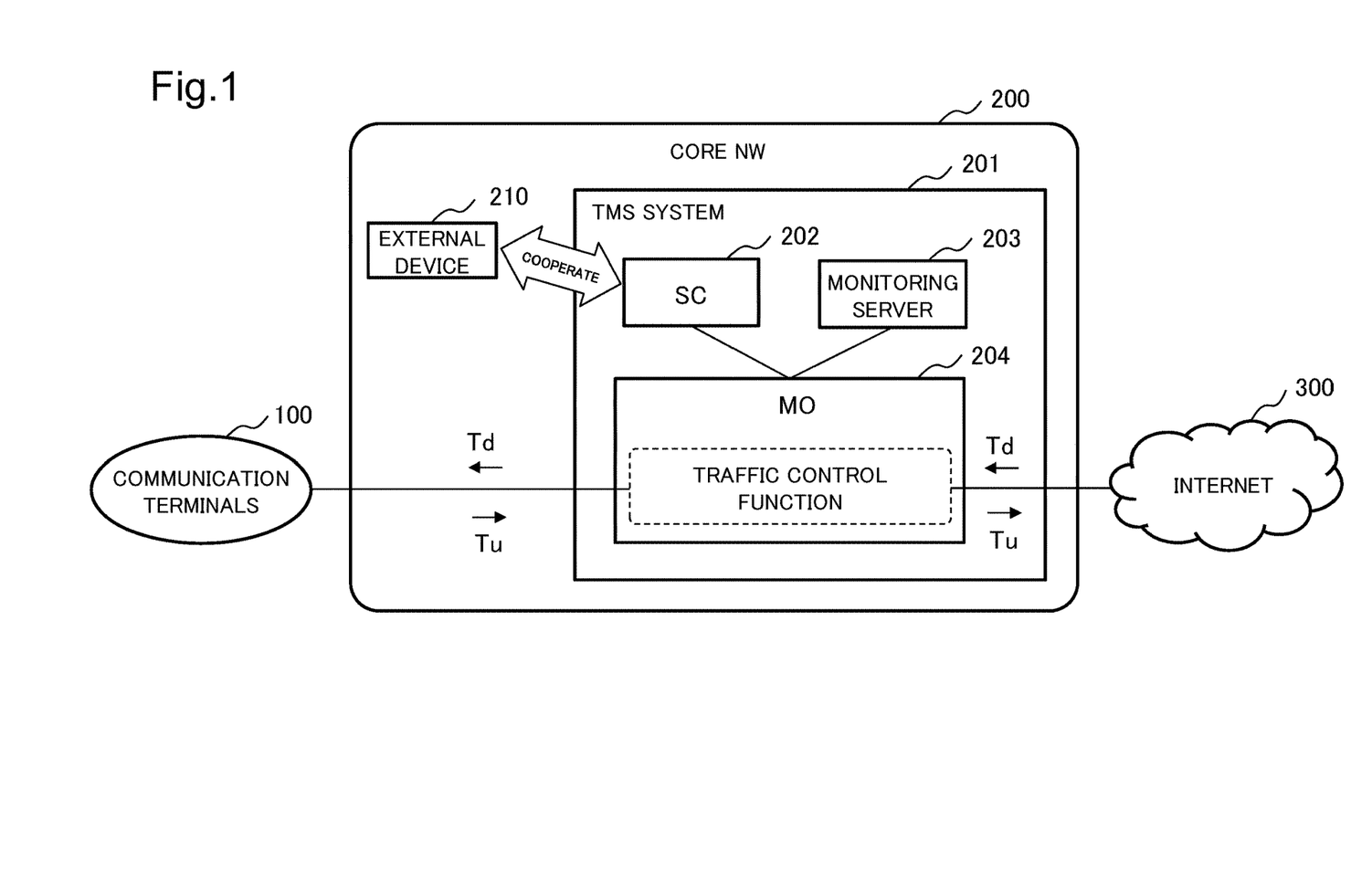
FIG. 1 shows a conceptual diagram illustrating a configuration example of a typical TMS system.

FIG. 1 shows a conceptual diagram illustrating a configuration of a TMS system 201, as an example of a typical TMS system.

The TMS system 201 is deployed in a core NW 200. Herein, NW is an abbreviation for network. The core NW 200 is a NW under control of a telecommunications carrier and is between communication terminals 100 under control of users and the like and the Internet 300.

The TMS system 201 includes an SC 202, a monitoring server 203, and an MO 204. Herein, SC is an abbreviation for TMS service controller. MO is an abbreviation for TMS media optimizer.

The SC 202 is constituted of a server. The SC 202, in cooperation with an external device 210, retains information extracted from contract information and the like with a user, which is retained by the external device 210. Herein, the external device 210 is, for example, a PGW, a AAA server, or a GGSN, and a PCRF. PGW is an abbreviation for packet data network gateway. AAA is an abbreviation for authentication, authorization, and accounting. GGSN is an abbreviation for gateway GPRS support node. PCRF is an abbreviation for policy and charging rules function. The SC 202 retains the information in the SC 202 in a form of a policy for each Internet protocol (IP) address.

In the TMS system 201, a downlink traffic Td in a direction from the Internet 300 to the communication terminals 100 and an uplink traffic Tu in a direction from the communication terminals 100 to the Internet 300 pass through the MO 204. At that time, the MO 204 controls a traffic of the downlink traffic Td by various methods such as controlling a flow speed and compressing data. Since the MO 204 handles a large amount of processing and needs to process at high speed, the MO 204 is constituted of a server group including a plurality of servers. In such a case, a load balancer (not shown) distributes the downlink traffic to the servers.

The MO 204 cooperates with the SC 202 as necessary when performing the control. Herein, in cooperation with the external device 210, the SC 202 retains information extracted from the contract information and the like with a user. When cooperating with the SC 202, the MO 204 controls traffic differently for each user in accordance with information based on the contract information with the user being retained in the SC 202 in a form of a policy for each IP address. Herein, IP is an abbreviation for Internet protocol.

The monitoring server 203 collects log information of the downlink traffic Td that has passed through the MO 204, and stores, analyzes, displays, and the like, the log information.

As described above, in the typical TMS system 201 shown in FIG. 1, the MO 204 controls traffic in accordance with a policy for each IP address being retained by the SC 202. However, in recent years, there has been an increasing demand for performing traffic control not for each IP address but for each predetermined IP address range allocated to a wholesale operator of a core NW 200. Herein, the wholesale operator is also referred to as a mobile virtual network operator (MVNO).

As a method of controlling traffic for each wholesale operator, it is conceivable to prepare as many servers for the MO 204, which perform processing for each IP address range relevant to each wholesale operator, as the number of wholesale operators.

Herein, PTL 1 discloses a method of controlling a traffic flow in accordance with a traffic flow control policy determined based on a type of access network in which a service on a data bearer via a gateway is provided.

Further, PTL 2 discloses a network management system that sets a network operation policy to each node for guaranteeing communication quality, performs predetermined analysis processing, based on operation information, and controls traffic, based on a result of monitoring the traffic.

CITATION LIST

Patent Literature

[PTL 1] Japanese Unexamined Patent Application Publication No. 2009-260986
[PTL 2] Japanese Unexamined Patent Application Publication No. 2001-237831

Non-Patent Literature

[NPL 1] "Traffic Management Solution," NEC Corporation, [retrieved on Aug. 19, 2019] on the Internet (https://jpn.nec.com/nsp/tms/index.html)

SUMMARY OF INVENTION

Technical Problem

However, processing capacity required for a server differs depending on each wholesale operator. For this reason, in the method of preparing as many servers for the MO 204 as the number of wholesale operators, server resources are wasted for a server for the wholesale operator that does not require a large amount of processing. Thus, it is necessary to implement flexible traffic control for each wholesale operator within a set of MO 204 servers through cooperation between the SC 202 and the MO 204.

An object of the present invention is to provide a setting device and the like that can set a traffic control rule for each wholesale operator according to an intention of an administrator or the like of a traffic control system.

Solution to Problem

A setting system according to the present invention is a setting system that sets control regulation information being information that combines a control rule for regulating traffic control of a core network between terminals including communication terminals and the Internet, and an internet protocol address of the communication terminal being a transmission source of the traffic to which the control rule is applied. The setting system includes: a switching setting information storage unit that stores switching setting information being information representing, for each wholesale operator of the core network, an internet protocol address of the communication terminal allocated to the wholesale operator and timing at which application of each piece of the control regulation information to the control is switched; and a setting unit that sets the control regulation information, based on the switching setting information, wherein the switching setting information is stored in the switching setting information storage unit by an input operation.

Advantageous Effects of Invention

A setting device and the like according to the present invention are able to set a traffic control rule for each wholesale operator according to an intention of an administrator or the like of a traffic control system.

EXAMPLE EMBODIMENT

In the TMS system of the present example embodiment, the SC does not cooperate with an external device. The TMS system generates policy definition information for switching by referring to switching setting information that was created in the TMS system for each wholesale operator. Herein, the policy definition information for switching is information that replaces policy definition information at a predetermined timing. The policy definition information is information that defines a traffic control rule at the MO. The wholesale operator is a wholesale operator of a core network. According to the above description, the TMS system can change a traffic control rule at a predetermined timing for each wholesale operator according to an intention of an administrator or the like of the TMS system.

Figure 2:
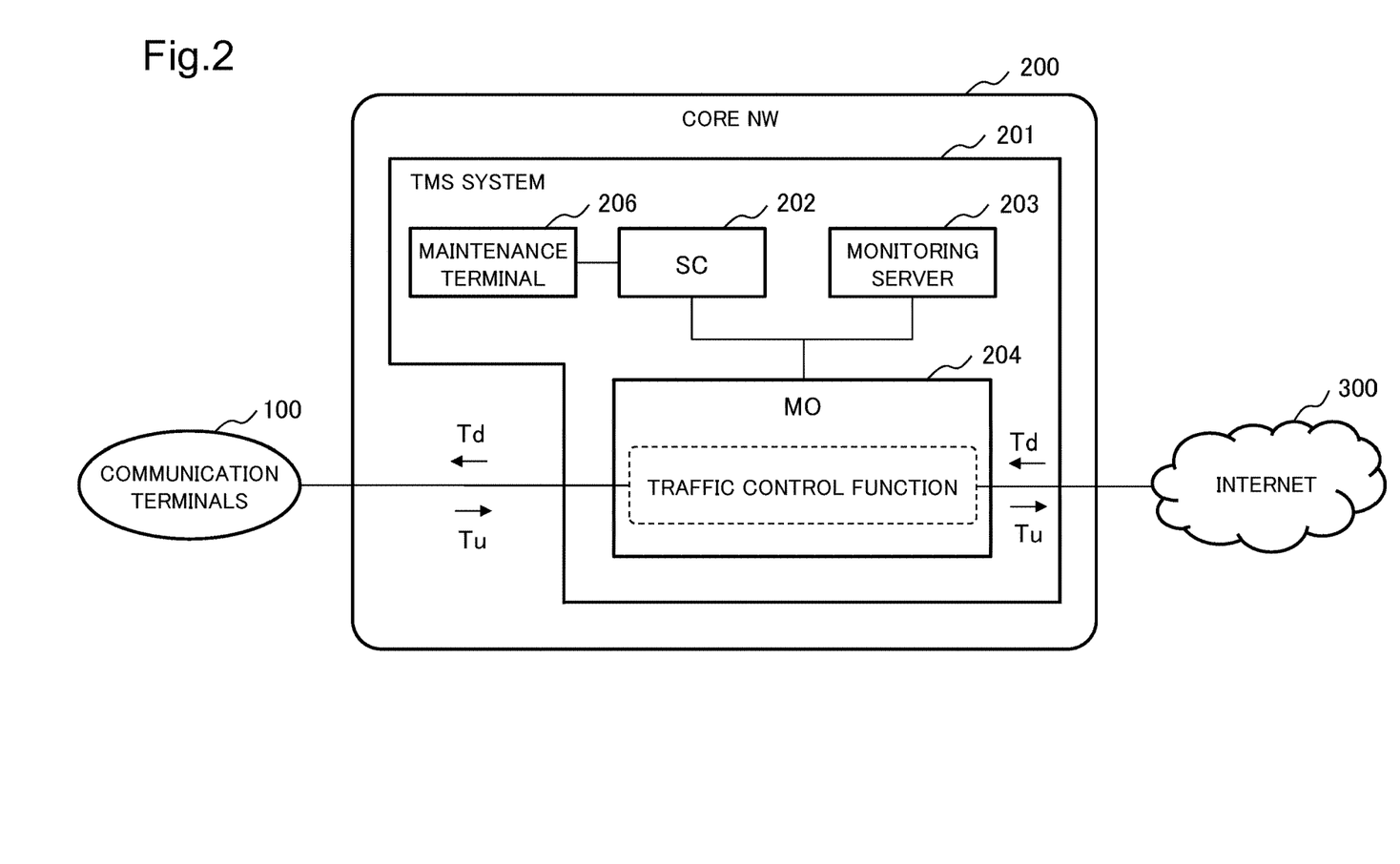
FIG. 2 shows a conceptual diagram illustrating a configuration example of a TMS system of the present example embodiment.

FIG. 2 shows a conceptual diagram illustrating the configuration of a TMS system 201 as an example of the TMS system of the present example embodiment. The description of the TMS system 201 shown in FIG. 2 is the same as the description of the TMS system 201 shown in FIG. 1, except for the following:

The TMS system 201 shown in FIG. 2 includes a maintenance terminal 206 in addition to the configuration equipped in the TMS system 201 shown in FIG. 1. The maintenance terminal 206 is a computer. The TMS system 201 shown in FIG. 2 differs from the TMS 201 shown in FIG. 1 in that the SC 202 does not coordinate with the external device 210.

Figure 3:
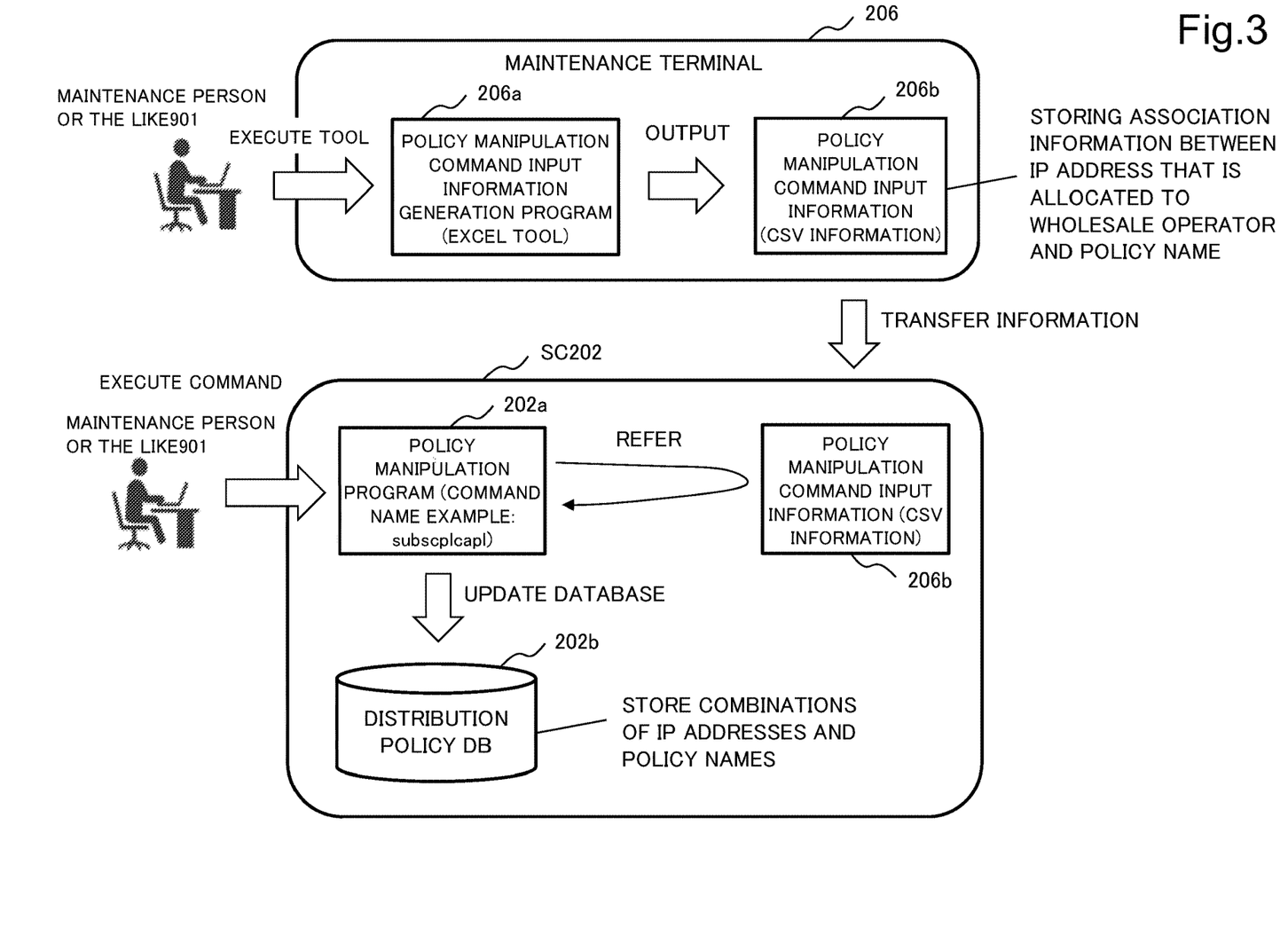
FIG. 3 shows a conceptual diagram illustrating a registration operation of a distribution policy DB by a maintenance person.

FIG. 3 shows a conceptual diagram illustrating a registration operation of a distribution policy DB by a maintenance person. Through the operation, the maintenance person or the like 901 registers, deletes, or changes combination information that combines an IP address that is information that identifies a user and a policy name in a distribution policy DB retained by the SC 202. Herein, the distribution policy DB is a database that stores a collection of combination information to be distributed to the MO 204 shown in FIG. 2, and is retained in a storing unit (not shown) equipped in the SC 202.

As shown in FIG. 3, the maintenance person or the like 901 first generates policy manipulation command input information 206b by an input operation through execution of a policy manipulation command input information generation program 206a. The policy manipulation command input information 206b is information that associates a range of IP addresses allocated to a wholesale operator of a core NW 200 with a policy name.

The description of executing a program herein means causing a computer (a server) to execute predetermined processing by the program. The policy manipulation command input information generation program 206a is, for example, an Excel tool. Further, the policy manipulation command input information 206b is, for example, Comma Separated Values (CSV) information.

The maintenance terminal 206 transfers the generated policy manipulation command input information 206b to the SC 202. As a result, the SC 202 retains the policy manipulation command input information 206b.

On the other hand, the maintenance person or the like 901 executes a policy manipulation program 202a on the SC 202. This causes the policy manipulation program 202a to refer to the policy manipulation command input information 206b retained by the SC 202 at that time and update the association information between the IP addresses and the policy name contained in the policy manipulation command input information 206b. The command name of a command that instructs to execute the policy manipulation program 202a is, for example, subscplcapl.

Figure 4:
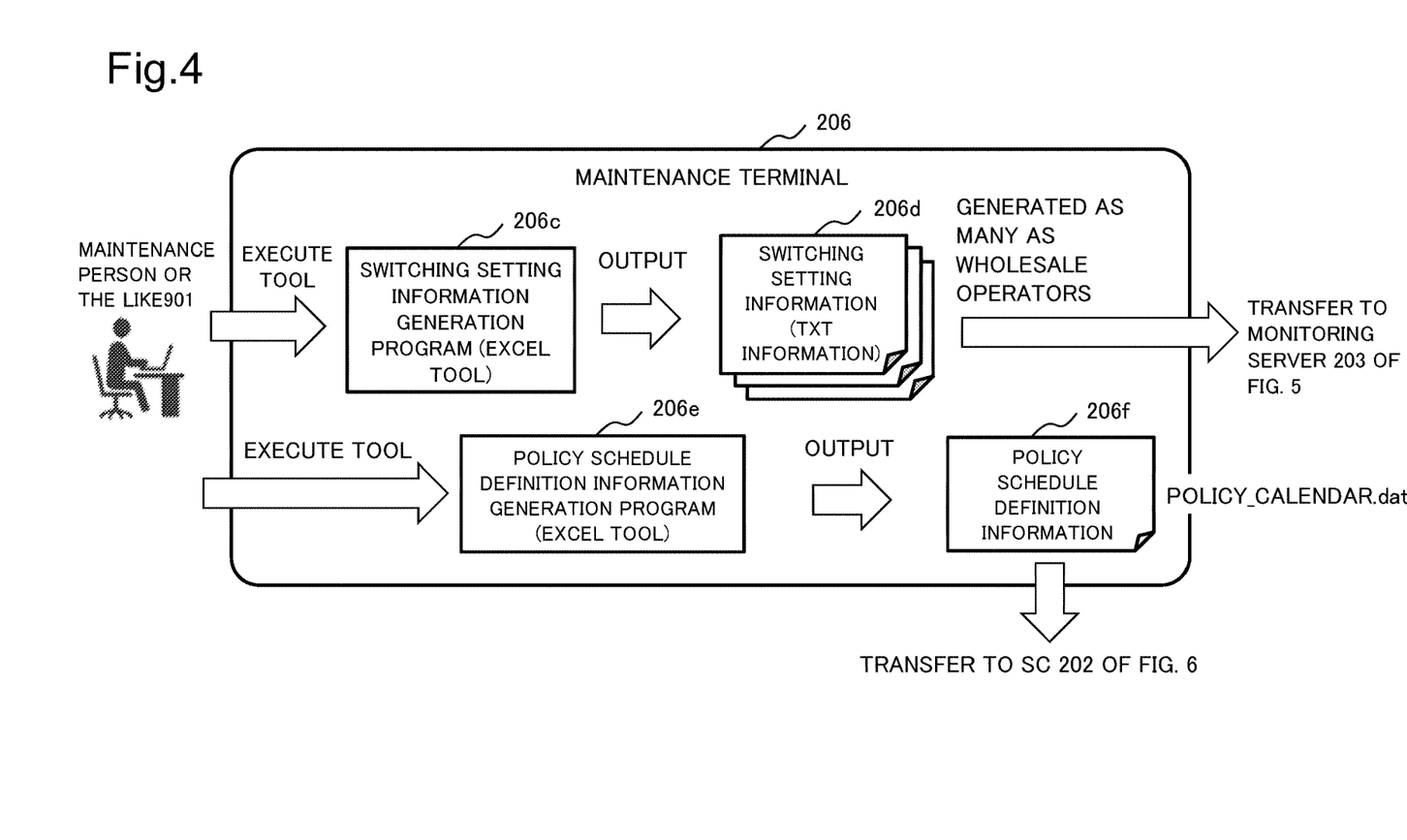
FIG. 4 shows a conceptual diagram illustrating how policy definition information for switching and policy schedule definition information is stored in the SC (Part 1).
Figure 5:
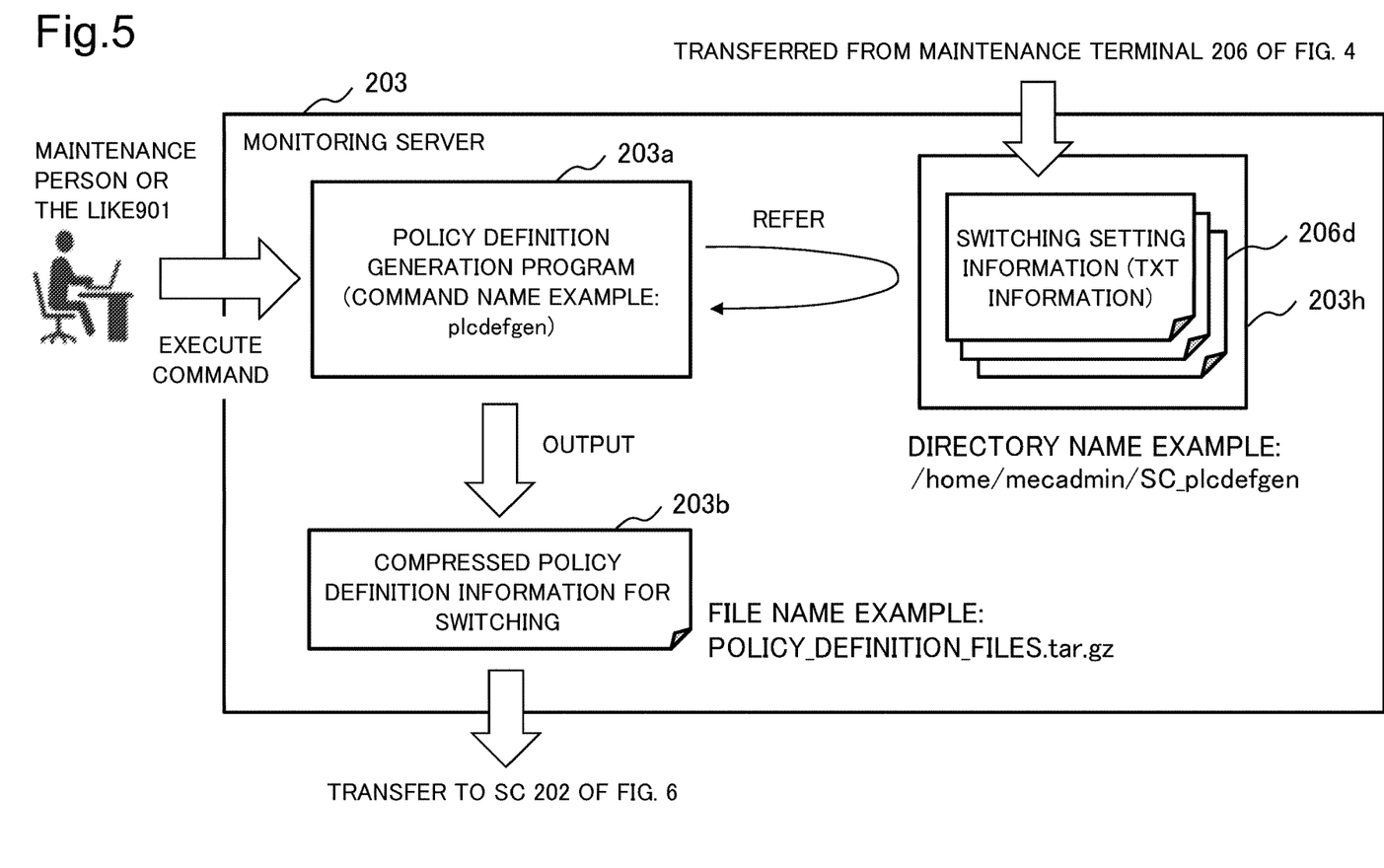
FIG. 5 shows a conceptual diagram illustrating how policy definition information for switching and policy schedule definition information is stored in the SC (Part 2).
Figure 6:
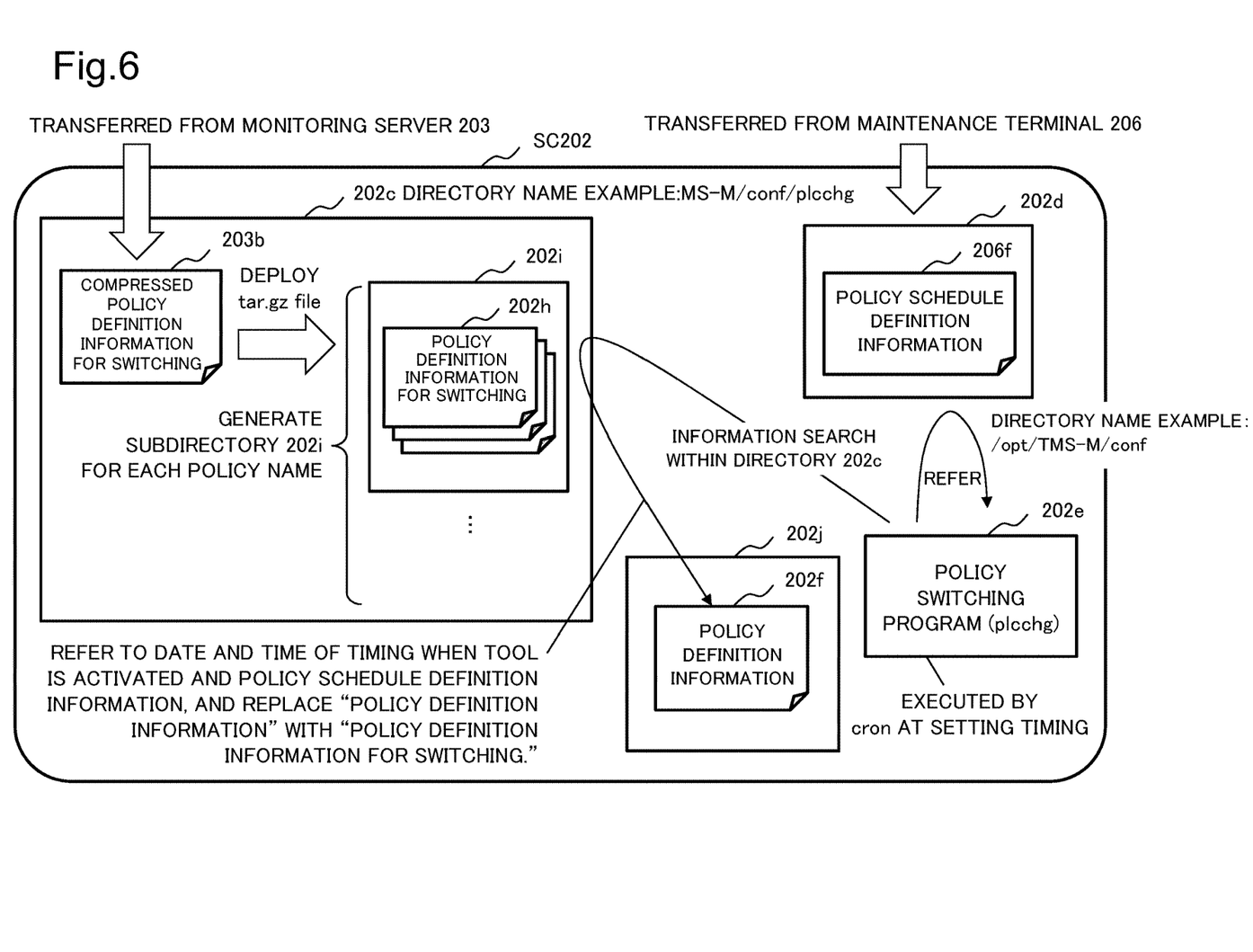
FIG. 6 shows a conceptual diagram illustrating how policy definition information for switching and policy schedule definition information is stored in the SC (Part 3).

FIGS. 4 to 6 are illustrations of how policy definition information for switching and policy schedule definition information are stored in the SC. Herein, the policy definition information for switching is information that replaces the policy definition information, which is already retained by the SC 202, at a predetermined timing. In addition, the policy schedule definition information is information that represents a timing at which each of the plurality of pieces of policy definition information for switching retained by the SC 202 replaces the policy definition information that is already retained by the SC 202.

As shown in FIG. 4, the maintenance person or the like 901 first generates switching setting information 206d by an input operation through execution of a switching setting information generation program 206c on the maintenance terminal 206.

The switching setting information 206d is information describing, for each wholesale operator, a timing at which each of the plurality pieces of policy definition information is switched (re-set). Herein, the policy definition information is information representing the association between a policy name and a control rule ID (identifier) that are used to control traffic. The control rule ID is an identifier representing a control rule classification value. The control rule classification value is a value representing the type of traffic control performed by the MO 204.

The switching setting information 206d is generated for each wholesale operator, as many as the number of wholesale operators.

The switching setting information generation program 206c is, for example, an Excel tool. The switching setting information 206d is, for example, txt (text) information. The maintenance terminal 206 transfers the generated switching setting information 206d to a monitoring server 203 shown in FIG. 5.

On the other hand, the maintenance person or the like 901 generates policy schedule definition information 206f by an input operation through execution of a policy schedule definition information generation program 206e. The policy schedule definition information generation program 206e is, for example, an Excel tool. The maintenance terminal 206 transfers the generated policy schedule definition information 206f to the SC 202 shown in FIG. 6.

Next, the maintenance person or the like 901 executes a policy definition generation program 203a on the monitoring server 203 as shown in FIG. 5. The command name of a command for instructing to execute the policy definition generation program 203a is, for example, "plcdefgen."

At this point, as described above, the monitoring server 203 retains the switching setting information 206d transferred from the maintenance terminal 206. The switching setting information 206d is, for example, stored in a storing unit (not shown) of the monitoring server 203 at the directory 203h under the name of "/home/mecadmin/SC_plcdefgen."

The monitoring server 203 refers to each piece of the switching setting information 206d by executing the policy definition generation program 203a. Then, at the timing of switching represented by the switching setting information 206d, the monitoring server 203 transfers compressed policy definition information for switching 203b to the SC 202 of FIG. 6. The compressed policy definition information for switching 203b is compressed information of policy definition information for switching. The file name of the compressed policy definition information for switching 203b is, for example, "POLICY_DEFINITION_FILES.tar.gz."

The above operation may be performed on the SC 202 or the MO 204 instead of the monitoring server 203. However, since the processing accompanying the above operation requires a large processing load, the operation is supposed to be performed on the monitoring server 203, of which processing load for other processing is relatively smaller.

The compressed policy definition information for switching 203b transferred from the monitoring server 203 shown in FIG. 5 is stored, for example, in the directory 202c under the directory name of "MS-M/conf/plcchg" at the SC 202 shown in FIG. 6.

When the compressed policy definition information for switching 203b is stored in the directory 202c, the SC 202 decompresses the compressed policy definition information for switching 203b, for example, by tar.gz deployment. Then, the SC 202 stores the decompressed policy definition information for switching 202h in a subdirectory 202i under the directory 202c. Policy definition information for switching is generated for each policy name. The policy definition information for switching including the same policy name is stored in the directory 202i to which the policy name is assigned. Files of policy definition information for switching are generated as many as resetting timings. The timings are, for example, 96 timings for 24 hours in 15-minute increments. Although one subdirectory 202i is shown in FIG. 6, there are actually a plurality of subdirectories 202i.

An upper limit may be set for the number of subdirectories 202i, if necessary. The upper limit is, for example, ten. The upper limit is set, for example, at a request of a core network operator.

The number of pieces of policy definition information for switching 202h in each subdirectory is, for example, for 24 hours in 15-minute increments. In such a case, the number of pieces of policy definition information for switching 202h stored in each subdirectory is 96.

On the other hand, the SC 202 stores policy schedule definition information 206f that was transferred from the maintenance terminal 206 shown in FIG. 4 in a directory 202d. The directory name of the directory 202d is, for example, "/opt/TMS-M/conf."

The SC 202 retains a policy switching program 202e in advance. The command name of a command for instructing to execute the policy switching program 202e is, for example, "plcchg."

The SC 202 executes the policy switching program 202e every 15 minutes, for example, by using a well-known cron function. The execution times are, for example, 0 minutes, 15 minutes, 30 minutes, and 45 minutes every hour.

The policy switching program 202e is a program that replaces the content of policy definition information 202f retained at the time of execution of the program with target policy definition information for switching 202h. The target policy definition information for switching 202h is one in which the SC 202 is associated with the execution time of the policy switching program 202e in advance among the policy definition programs for switching retained at that time. When the policy switching program 202e is executed by the cron function, the policy switching program 202e first refers to the policy schedule definition information 206f stored in the directory 202d. Then, the policy switching program 202e acquires identification information for identifying policy definition information for switching 202h corresponding to the execution date and time of the policy switching program 202e based on the policy schedule definition information 206f. Then, the policy switching program 202e searches a collection of policy definition information for switching 202h in the directory 202c based on the acquired identification information, and selects the policy definition information for switching 202h that matches the identification information. Then, the policy definition information 202f stored in the directory 202j is replaced by the selected policy definition information for switching 202h.

Figure 7:
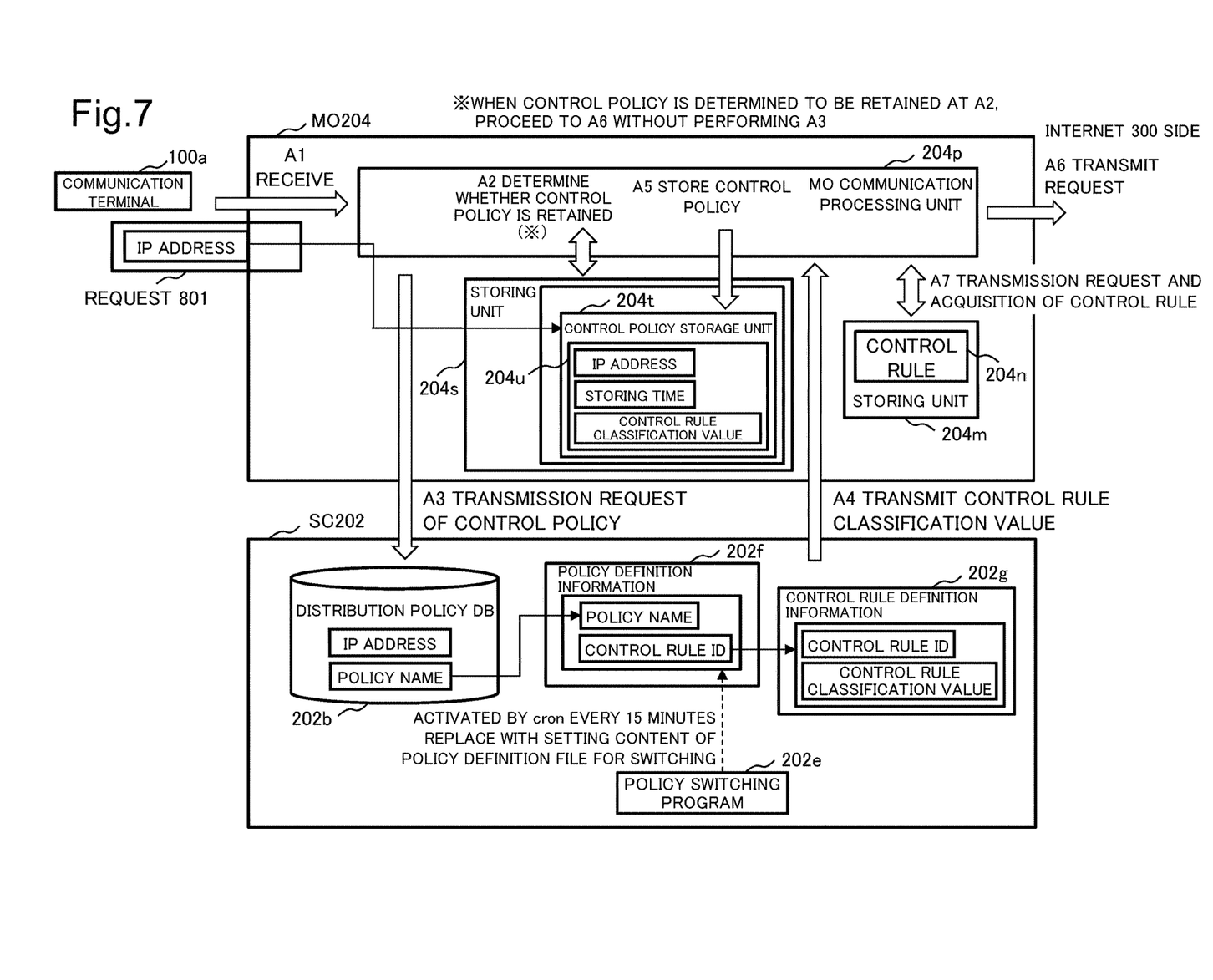
FIG. 7 shows a conceptual diagram illustrating an operational flow in which a control policy is set in the TMS system.

FIG. 7 shows a conceptual diagram illustrating an operational flow in which a control policy is set in the TMS system shown in FIG. 2. Herein, the communication terminal is a communication terminal included in the communication terminals 100 shown in FIG. 2.

Before explaining the operational flow, the configuration of the MO 204 and the SC 202 shown in FIG. 7, which is the premise of the operational flow, is described.

The MO 204 includes an MO communication processing unit 204p and storing units 204m and 204s. The MO communication processing unit 204p is a part of the MO 204 that performs communication and information processing.

The storing unit 204m stores a plurality of control rules 204n. In FIG. 7, the storing unit 204m stores one control rule 204n, but actually stores a plurality of control rules 204n. Each control rule 204n is assigned a control rule classification value that is an identifier representing the control rule.

The storing unit 204s includes a control policy storage unit 204t. The control policy storage unit 204t stores a control policy 204u. The control policy 204u is a combination of an IP address, time when the control policy 204u is stored in the control policy storage unit 204t, and a control rule classification value.

The SC 202 has a configuration including a server as described above. Thus, the SC 202 includes a communication processing unit (hereinafter referred to as the "SV communication processing unit") that performs communication and processing and a storing unit. However, in FIG. 7, these units are omitted from the illustration, and, instead, the contents of information and the program stored in the storing unit are shown.

The storing unit (not shown) of the SC 202, stores a distribution policy DB 202b, policy definition information 202f, control rule definition information 202g, and a policy switching program 202e.

The distribution policy DB 202b is the one shown in FIG. 3. The distribution policy DB 202b stores a plurality of combinations of IP addresses and policy names. Although, in FIG. 7, the distribution policy DB 202b stores one combination of an IP address and a policy name, this is a conceptual illustration, and in fact, a plurality of combinations of IP addresses and policy names are stored.

The policy definition information 202f and the policy switching program 202e are the ones shown in FIG. 6.

The policy definition information 202f includes a plurality of control rule IDs (identifiers) with assigned policy names. The control rule ID is an identifier that allows identification of a control rule as described above.

Although the policy definition information 202f includes one control rule ID with an assigned policy name in FIG. 7, this is a conceptual illustration, and in fact, a plurality of control rule IDs with assigned policy names are stored.

As described with reference to FIG. 6, the policy switching program 202e replaces policy definition information 202f, for example, every 15 minutes by the cron function. The replacement is performed with one that is defined by the policy schedule definition information 206f as to be switched at the date and time among the policy definition information for switching 202h shown in FIG. 6. As a result, the policy schedule definition information 206f is updated with a new content.

The control rule definition information 202g includes a plurality of combinations of control rule IDs and control rules. Although the control rule definition information 202g includes one combination of a control rule ID and a control rule in FIG. 7, this is a conceptual illustration, and in fact, a plurality of control rule IDs and control rules are stored.

Next, on the premise of the above configuration, an operational flow performed by the MO 204 and the SC 202 is described below.

First of all, it is assumed that the communication terminal 100a transmits a request 801 to the Internet 300 shown in FIG. 2. The communication terminal 100a is a communication terminal included in the communication terminals 100 shown in FIG. 2. The request 801 is information that requests a web (World Wide Web) transmission to be transmitted from the communication terminal 100a to the Internet 300. The IP header of the request 801 includes the IP address of the communication device 100a.

From the communication terminal 100a, the MO communication processing unit 204p receives, as A1 operation, the request 801 from the communication terminal 100a and acquires the IP address included in the IP header of the request 801.

Then, the MO communication processing unit 204p determines, as A2 operation, whether a control policy 204u including the IP address exists in a collection of control policy information retained by the control policy storage unit 204t of the storing unit 204s.

When the MO communication processing unit 204p determined that the control policy 204u for the IP address of the communication terminal 100a is not retained through A2 operation, the MO communication processing unit 204p performs A3 operation. On the other hand, when the MO communication processing unit 204p determined that the control policy for the IP address of the communication terminal 100a is already retained through A2 operation, the MO communication processing unit 204p performs A6 operation.

When the MO communication processing unit 204p performs A3 operation, the MO communication processing unit 204p requests the SC 202 to transmit a control policy for the IP address of the communication terminal 100a.

A SC communication processing unit that is a communication processing unit (not shown) in the SC 202, receives the request and determines whether a policy name that is associated with the requested IP address is stored in the distribution policy DB 202b. When the policy name is stored in the distribution policy DB 202b, the SC communication processing unit identifies policy definition information 202f to which the policy name is assigned. Then, the SC communication processing unit identifies control rule definition information 202g including a control rule classification value to which the control rule ID included in the policy definition information 202f is assigned. Then, the SC communication processing unit transmits, to the MO communication processing unit 204p, a combination of the IP address transmitted through A3 operation and the control rule classification value identified from the IP address.

However, it can also be assumed that the policy name associated with the IP address, which is requested by the MO communication processing unit 204p through A3 operation, is not stored in the distribution policy DB 202b. In such a case, the SC communication processing unit transmits, to the MO communication processing unit 204p, information indicating that there is no control rule classification value that is combined with the IP address.

The MO communication processing unit 204p receives the transmission from the SC communication processing unit, and as A5 operation, newly stores a control policy 204u including the transmitted IP address and control rule classification value in the control policy storage unit 204t. However, when the MO communication processing unit 204p receives the transmission of information indicating that there is no control rule classification value combined with the IP address transmitted from the SC communication processing unit, the MO communication processing unit 204p performs the following: That is, the MO communication processing unit 204p stores a control policy 204u that combines the IP address and a default control rule classification value, which is set in advance, in the control policy storage unit 204*t*.

The request 801 that is received from the communication terminal 100*a* is transmitted to the Internet 300 as A6 operation.

When the MO communication processing unit 204*p* subsequently transmits transmission information from the Internet 300 to the communication terminal 100*a*, the MO communication processing unit 204*p* acquires the IP address of the transmission destination included in the IP header of the transmission information. Then, the MO communication processing unit 204*p* acquires the control policy 204*u* that is combined with the IP address from the control policy storage unit 204*t*.

Then, as operation A7, the MO communication processing unit 204*p* acquires a control rule of the control rule classification value that is included in the control policy 204*u* from the storing unit 204*m*. Then, the MO communication processing unit 204*p* transmits the transmission information to the communication terminal 100*a* while performing communication control on the transmission information in accordance with the acquired control rule.

Figure 8:
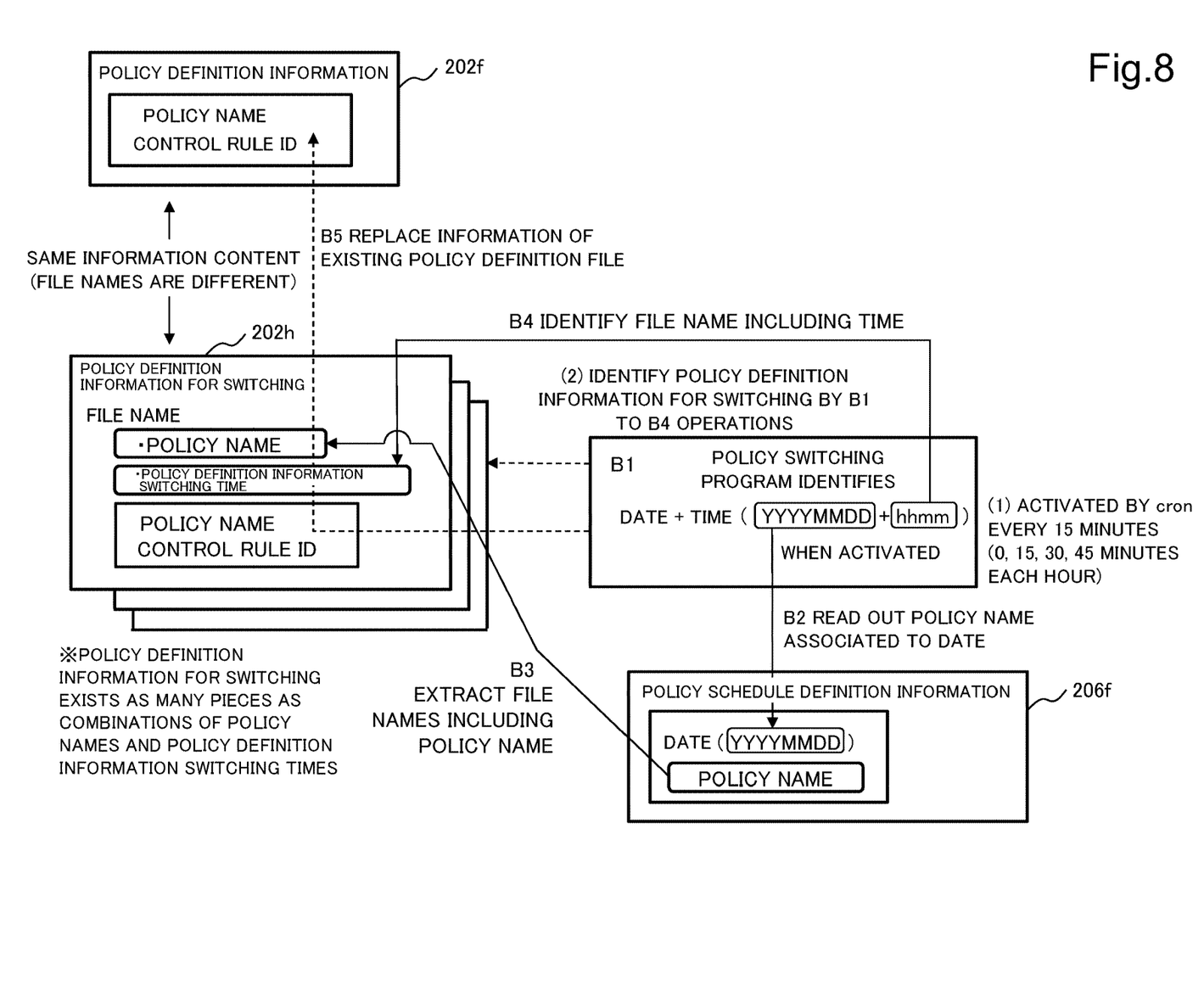
FIG. 8 shows a conceptual diagram illustrating an operational example performed by the SC by executing a policy switching program.

FIG. 8 shows a conceptual diagram illustrating an operational example performed by the SC 202 by the policy switching program 202*e* shown in FIG. 6.

A policy switching command for instructing to execute the policy switching program 202*e* is registered in cron. The policy switching command is set by cron to be executed, for example, every 15 minutes at 0, 15, 30, and 45 minutes every hour.

As shown in (1) of FIG. 8, cron executes the policy switching command at the set time.

Then, the policy switching program 202*e* identifies the date and time of the activation as B1 operation.

Then, the policy switching program 202*e* reads out a policy name stored in association with the date from the policy schedule definition information 206*f* shown in FIG. 6 as B2 operation.

The policy switching program 202*e* then searches file names of plurality pieces of policy definition information for switching 202*h* shown in FIG. 6, and extracts a file name that contains the policy name that was read out in B2 operation. Herein, it is assumed that the policy definition information for switching 202*h* includes, in its file name, a policy name contained in the information and time at which the information replaces policy definition information. The policy definition information for switching 202*h* is, as described above, combination of a policy name and a control rule ID.

Then, as operation B4, the policy switching program 202*e* identifies a file name that matches the time identified in operation B1 from the file names identified in operation B3. A single file name is identified by operation B4.

Then, as operation B5, the policy switching program 202*e* replaces the policy name and control rule ID included in the policy definition information 202*f* shown in FIG. 6. The replacement is performed using a combination of the policy name and the control rule ID included in the policy definition information for switching 202*h* of the file name identified by operation B4.

As a result of the above, the policy name and control rule ID of the policy definition information become the same as the policy name and control rule ID of the policy definition information for switching 202*h* identified in operation B5. However, the policy definition information and the policy definition information for switching have different file names.

[Effect]

The TMS system according to the present example embodiment generates policy definition information for switching by referring to switching setting information that is created in the TMS system for each wholesale operator. Herein, the policy definition information for switching is information that replaces the policy definition information at a predetermined timing. The policy definition information is information that defines a traffic control rule at the MO. The wholesale operator is a wholesale operator of a core network. In this way, the TMS system can change a traffic control rule at a predetermined timing for each wholesale operator according to an intention of an administrator or the like of the TMS system.

In addition, since the period and man-hours for system development are limited, it is desirable to develop a system with as few changes as possible to the typical TMS system configuration. The above-described TMS system has a simple system configuration that does not cooperate with any external node, and can change a control policy for each user and each time period with a set of MOs. The above-described TMS system is configured as a closed TMS system without cooperating with any external device or system related to billing. Therefore, the TMS system can greatly reduce man-hours that are required for designing, verification testing, and/or the like at the time of introduction, thereby shortening delivery time.

Figure 9:
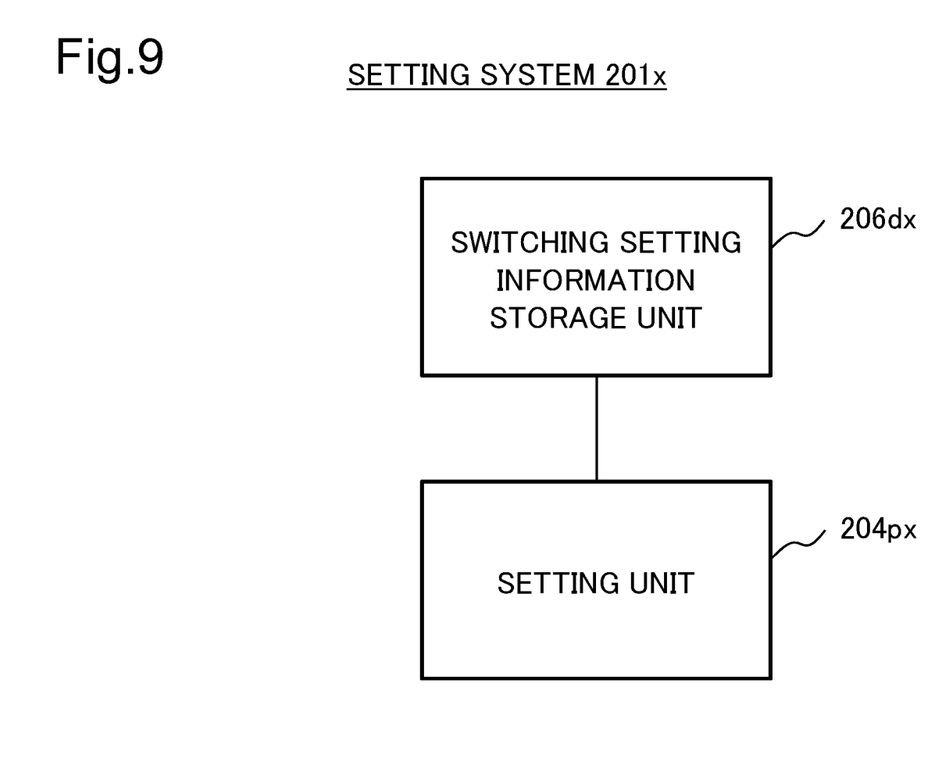
FIG. 9 shows a block diagram illustrating a minimum configuration of a setting system of an example embodiment.

FIG. 9 shows a block diagram illustrating the configuration of the setting system 201*x* that is the minimum configuration of the setting system of the example embodiment.

The setting system 201*x* sets control regulation information that is information that combines a control rule and the internet protocol addresses of the communication terminals that are the transmission sources of the traffic to which the control rule is applied. Herein, the control rule regulates control on traffic in a core network between terminals consisting of communication terminals and the Internet.

The setting system 201*x* includes a switching setting information storage unit 206*dx* and a setting unit 204*px*. The switching setting information storage unit 206*dx* stores switching setting information. The switching setting information is information representing, for each wholesale operator of the core network, internet protocol addresses of the communication terminals allocated to the wholesale operator and a timing of switching application of each piece of the control regulation information to the control. The setting unit 204*px* sets the control regulation information based on the switching setting information. The switching setting information is stored in the switching setting information storage unit by an input operation.

In the setting system 201*x*, the switching setting information is stored in the switching setting information storage unit by an input operation. Thus, the setting system 201*x* can set a traffic control rule for each wholesale operator at a predetermined timing according to an intention of an administrator or the like of a traffic control system.

Therefore, the setting system 201*x*, by virtue of the aforementioned configuration, achieves the effects described in the section [Advantageous Effects of Invention].

The setting system 201*x* is, for example, a part related to the setting within the TMS system 201 shown in FIG. 2. The control rule is, for example, the control policy 204*u* shown in FIG. 7. The communication terminal is, for example, the communication terminal 100*a* shown in FIG. 7. The control regulation information is, for example, the control rule classification value shown in FIG. 7. The switching setting information storage unit 206dx is, for example, the switching setting information 206d shown in FIG. 5. The setting unit 204px is, for example, the MO communication processing unit 204p shown in FIG. 7. Further, the input operation is an execution operation of the switching setting information generation program 206c conducted by the maintenance person or the like 901 shown in FIG. 4.

While the invention has been particularly shown and described with reference to exemplary embodiments thereof, the invention is not limited to these embodiments, and further changes, replacements, adjustments may be made therein without departing from the spirit and scope of the present invention. For example, the configuration of the elements shown in each drawing is an example to assist in understanding the present invention, and is not limited to the configuration shown in these drawings.

In addition, some or all of the above-described example embodiments may also be described as in the following Supplementary Notes, but are not limited to the following.

(Supplementary Note 1)

A setting system that sets control regulation information being information that combines a control rule that regulates traffic control in a core network between terminals including communication terminals and the Internet, and an internet protocol address of the communication terminal being a transmission source of the traffic to which the control rule is applied, the setting system comprising:

a switching setting information storage unit that stores switching setting information being information representing, for each wholesale operator of the core network, an internet protocol address of the communication terminal being allocated to the wholesale operator and a timing of switching application of each piece of the control regulation information to the control; and a setting unit that sets the control regulation information, based on the switching setting information, wherein the switching setting information is stored in the switching setting information storage unit by an input operation.

(Supplementary Note 2)

The setting system according to Supplementary Note 1, wherein the input operation is performed on a maintenance terminal that is connected to the setting system.

(Supplementary Note 3)

The setting system according to Supplementary Note 1 or 2 further comprising:

an input information storage unit that stores input information that associates each piece of definition information for identifying the control rule with an internet protocol address of the communication terminal as a transmission source of the traffic;

a planning information storage unit that stores planning information representing a timing of switching application of the definition information to the control; and a definition information for setting storage unit that stores definition information for setting being information generated based on the switching setting information and scheduled to be set as the definition information, wherein the setting unit includes a first setting unit that sets the definition information for setting as the definition information according to the planning information, and a second setting unit that sets the control regulation information, based on the definition information.

(Supplementary Note 4)

The setting system according to Supplementary Note 3, wherein at least one of the switching setting information, the planning information, and the input information is generated at a maintenance terminal.

(Supplementary Note 5)

A control system comprising:

the setting system according to Supplementary Note 1 or 2; and a control unit that performs the control in accordance with the control regulation information.

(Supplementary Note 6)

A control system comprising:

the setting system according to Supplementary Note 3 or 4; and a control unit that performs the control in accordance with the control regulation information.

(Supplementary Note 7)

The control system according to Supplementary Note 6 that performs the control in accordance with the control regulation information that is combined with the internet protocol address acquired from reception information transmitted from the communication terminal.

(Supplementary Note 8)

The control system according to Supplementary Note 6 or 7 further comprising: a first server; a second server; and a third server, wherein the first server includes the switching setting information storage unit, the second server includes the input information storage unit, the planning information storage unit, the definition information for setting storage unit, and the first setting unit, and the third server includes the second setting unit and the control unit.

(Supplementary Note 9)

The control system according to Supplementary Note 8, wherein the first server is a Traffic Management Solution Service Controller, the second server is a Traffic Management Solution Visualizer, and the third server is a Traffic Management Solution Media Optimizer.

(Supplementary Note 10)

The control system according to any one of Supplementary Notes 5 to 9, wherein the control is performed on the traffic that is directed from the Internet to the communication terminal.

Note that the communication terminal described in the above Supplementary Notes is, for example, the communication terminal 100a shown in FIG. 7. The Internet is, for example, the Internet 300 shown in FIG. 2. The core network is, for example, the core NW 200 shown in FIG. 2. The traffic control is the traffic control that is performed by the traffic control operation of the MO 204 shown in FIG. 2. The control rule is, for example, the control rule 204n shown in FIG. 7.

The internet protocol address is, for example, the IP address of the control policy 204u shown in FIG. 7. The control regulation information is, for example, a control rule classification value of the control policy 204u shown in FIG. 7. The setting system is, for example, a part of the TMS system shown in FIG. 2.

The switching setting information is, for example, switching setting information 206d shown in FIGS. 4 and 5. The switching setting information storage unit is, for example, the directory 203h shown in FIG. 5. The setting unit is, for example, a part of the above-described SC communication control unit executed by the policy switching program 202e shown in FIG. 6.

The input operation is execution of the switching setting information generation program 206c conducted by the maintenance person or the like 901 shown in FIG. 4. The maintenance terminal is, for example, the maintenance terminal 206 shown in FIG. 4. The definition information is, for example, the policy definition information 202f shown in FIG. 6. The input information is combinations of IP addresses and policy names stored in the distribution policy DB 202b shown in FIGS. 3 and 7.

The input information storage unit is the distribution policy DB 202b shown in FIGS. 3 and 7. The planning information is, for example, the policy schedule definition information 206f shown in FIGS. 4 and 6. The planning information storage unit is, for example, the directory 202d shown in FIG. 6. The definition information for setting is, for example, the policy definition information for switching 202h shown in FIG. 6. The definition information for setting storage unit is, for example, a subdirectory 202i shown in FIG. 6.

The first setting part is, for example, a part of the SC 202 shown in FIG. 6, which is executed by the policy switching program 202e of the above-described SC communication processing unit. The second setting unit is a part of the MO communication processing unit 204p shown in FIG. 7, which sets the control regulation information. Further, the control unit is a part having a traffic control function shown in FIG. 2 of the MO communication processing unit 204p shown in FIG. 7.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

100 Communication terminals
100a Communication terminal
200 Core NW
201 TMS system
202 SC
202a Policy manipulation program
202b Distribution policy DB
202c, 202d, 202i, 203h Directory
202e Policy switching program
202f Policy definition information
202h Policy definition information for switching
202g Control rule definition information
203 Monitoring server
203a Policy definition generating program
203b Compressed policy definition information for switching
204 MO
204m, 204s Storing unit
204n Control rule
204p MO communication processing unit
204px Setting unit
204t Control policy storage unit
204u Control policy
206 Maintenance terminal
206a Policy manipulation command input information generation program
206b Policy manipulation command input information
206c Switching setting information generation program
206d Switching setting information
206dx Switching setting information storage unit
206e Policy schedule definition information generation program
206f Policy schedule definition information
210 External device
300 Internet
801 Request
901 Maintenance person or the like

The invention claimed is:

1. A setting system that sets control regulation information being information that combines a control rule that regulates traffic control in a core network between terminals including communication terminals and the Internet, and an internet protocol address of the communication terminal being a transmission source of the traffic to which the control rule is applied, the setting system comprising:
  switching setting information storage that store switching setting information being information representing, for each wholesale operator of the core network, an internet protocol address of the communication terminal being allocated to the wholesale operator and a timing of switching application of each piece of the control regulation information to the traffic control;
  one or more memories storing instructions; and
  one or more processors configured to execute the instructions to set the control regulation information, based on the switching setting information, wherein
  the switching setting information is stored in the switching setting information storage by an input operation, wherein
  the control regulation information includes a control rule classification value as an information of the control rule, and
  the control rule classification value is an identifier representing the control rule among a plurality of control rules.

2. The setting system according to claim 1, wherein the input operation is performed on a maintenance terminal that is connected to the setting system.

3. The setting system according to claim 1 further comprising:
  input information storage that stores input information that associates each piece of definition information for identifying the control rule with an internet protocol address of the communication terminal as a transmission source of the traffic;
  planning information storage that store planning information representing a timing of switching application of the definition information to the traffic control; and
  definition information for setting storage that store definition information for setting being information generated based on the switching setting information and scheduled to be set as the definition information, wherein
  the one or more processors configured to execute the instructions to
  set the definition information for setting as the definition information according to the planning information, and
  set the control regulation information, based on the definition information.

4. The setting system according to claim 3, wherein at least one of the switching setting information, the planning information, and the input information is generated at a maintenance terminal.

5. A control system comprising
a setting system that sets control regulation information being information that combines a control rule that regulates traffic control in a core network between terminals including communication terminals and the Internet, and an internet protocol address of the communication terminal being a transmission source of the traffic to which the control rule is applied,
wherein the setting system comprises
switching setting information storage that store switching setting information being information representing, for each wholesale operator of the core network, an internet protocol address of the communication terminal being allocated to the wholesale operator and a timing of switching application of each piece of the control regulation information to the traffic control,
one or more memories storing instructions, and
one or more processors configured to execute the instructions to
set the control regulation information, based on the switching setting information, and
perform the traffic control in accordance with the control regulation information,
wherein the switching setting information is stored in the switching setting information storage by an input operation,
wherein the control regulation information includes a control rule classification value as an information of the control rule, and
wherein the control rule classification value is an identifier representing the control rule among a plurality of control rules.

6. The control system according to claim 5,
wherein the setting
further comprises
input information storage that stores input information that associates each piece of definition information for identifying the control rule with an internet protocol address of the communication terminal as a transmission source of the traffic,
planning information storage that store planning information representing a timing of switching application of the definition information to the traffic control, and
definition information for setting storage that store definition information for setting being information generated based on the switching setting information and scheduled to be set as the definition information, and
wherein the one or more processors configured to execute the instructions to
set the definition information for setting as the definition information according to the planning information, and
set the control regulation information, based on the definition information.

7. The control system according to claim 6 that performs the traffic control in accordance with the control regulation information that is combined with the internet protocol address acquired from reception information transmitted from the communication terminal.

8. The control system according to claim 6 further comprising:
a first server;
a second server; and
a third server, wherein
the first server includes the switching setting information storage,
the second server includes the input information storage, the planning information storage, the definition information for setting storage, and the one or more processors for setting the definition information for setting, and
the third server includes the one or more processors for setting the control regulation information.

9. The control system according to claim 8, wherein
the first server is a Traffic Management Solution Service Controller, the second server is a Traffic Management Solution Visualizer, and the third server is a Traffic Management Solution Media Optimizer.

10. The control system according to claim 5, wherein
the traffic control is performed on the traffic that is directed from the Internet to the communication terminal.

* * * * *